(12) United States Patent
Shon et al.

(10) Patent No.: US 10,089,800 B2
(45) Date of Patent: Oct. 2, 2018

(54) KEYLESS ENTRY SYSTEM AND CONTROL METHOD FOR THE SAME

(71) Applicants: Hyundai Motor Company, Seoul (KR); Kia Motors Corporation, Seoul (KR)

(72) Inventors: Kyong Ho Shon, Gyeonggi-do (KR); Gi Hoon Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 941 days.

(21) Appl. No.: 14/468,686

(22) Filed: Aug. 26, 2014

(65) Prior Publication Data

US 2015/0161831 A1 Jun. 11, 2015

(30) Foreign Application Priority Data

Dec. 5, 2013 (KR) .................. 10-2013-0150690

(51) Int. Cl.
*B60R 25/24* (2013.01)
*G07C 9/00* (2006.01)

(52) U.S. Cl.
CPC .......... *G07C 9/00007* (2013.01); *B60R 25/24* (2013.01); *G07C 9/00182* (2013.01); *G07C 2009/00253* (2013.01); *G07C 2009/00261* (2013.01); *G07C 2009/00793* (2013.01); *G07C 2209/08* (2013.01)

(58) Field of Classification Search
CPC ..................................................... A47B 47/00
See application file for complete search history.

(56) References Cited

U.S. PATENT DOCUMENTS

| | | | | |
|---|---|---|---|---|
| 4,670,746 A * | 6/1987 | Taniguchi | ............. | B60R 25/246 180/287 |
| 5,552,641 A * | 9/1996 | Fischer | .................. | B60R 25/04 180/287 |
| 6,424,285 B1* | 7/2002 | Perdue | .................. | G08C 17/02 341/176 |
| 2010/0231351 A1* | 9/2010 | Lickfelt | ................. | B60R 25/04 340/5.6 |

(Continued)

FOREIGN PATENT DOCUMENTS

| | | |
|---|---|---|
| JP | 08-105254 A | 4/1996 |
| JP | 08-199882 A | 8/1996 |

(Continued)

*Primary Examiner* — Joseph Feild
*Assistant Examiner* — Pameshanand Mahase
(74) *Attorney, Agent, or Firm* — Mintz Levin Cohn Ferris Glovsky and Popeo, P.C.; Peter F. Corless

(57) ABSTRACT

A keyless entry system for remotely controlling a door and a window of a vehicle includes: a remote control key that stores a plurality of function codes, selects a function code corresponding to an on-duration time of a lock switch or an on-duration time of an unlock switch, modulates the selected function code to a wireless signal, and transmits the wireless signal; and a receiving device that receives the wireless signal, demodulates the wireless signal into the function code, and outputs a door control signal or a window control signal according to the modulated function code, where the function code is divided into a basic function code field and a window function code field.

16 Claims, 6 Drawing Sheets

(56) References Cited

U.S. PATENT DOCUMENTS

2013/0028213 A1\* 1/2013 Ko ................... H04B 7/0623
　　　　　　　　　　　　　　　　　370/329
2014/0266583 A1\* 9/2014 Lopez ............... G07C 9/00857
　　　　　　　　　　　　　　　　　340/5.26

FOREIGN PATENT DOCUMENTS

| JP | 09-119253 A | 5/1997 |
|---|---|---|
| JP | 2006104665 A | 4/2006 |
| JP | 2012-149473 A | 8/2012 |
| KR | 10-0181490 | 12/1998 |
| KR | 20-0413126 | 4/2006 |
| KR | 10-2013-0021560 | 3/2013 |

\* cited by examiner

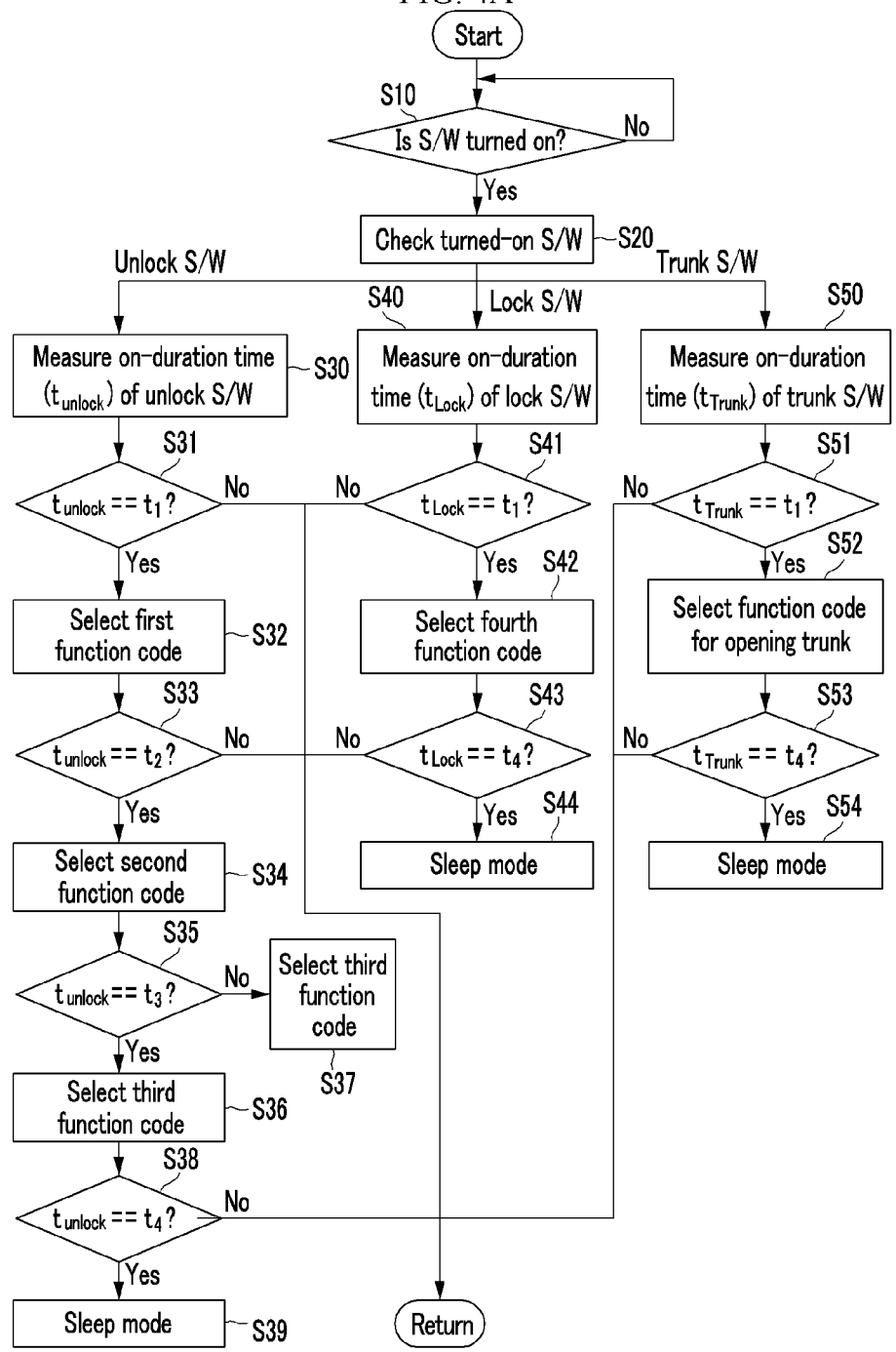

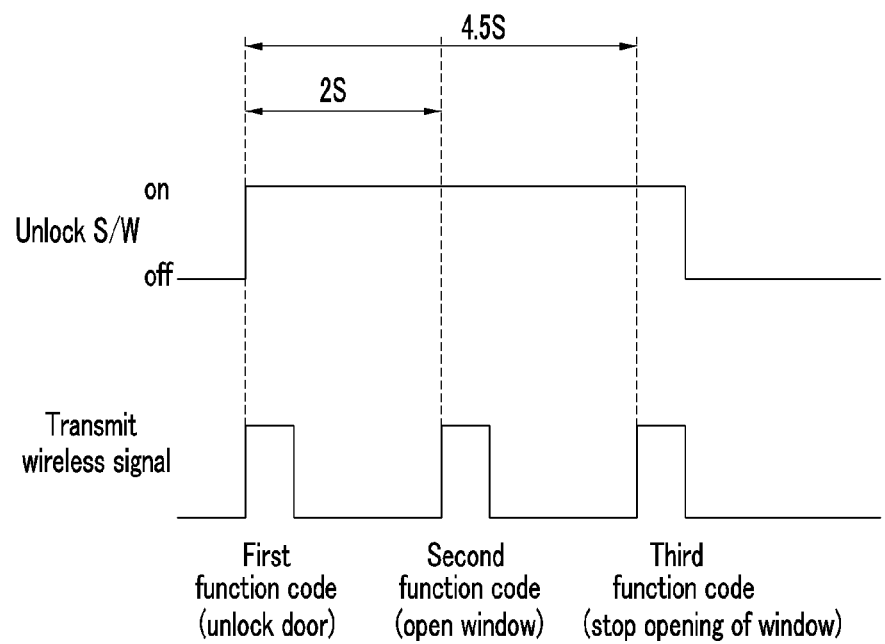

KEYLESS ENTRY SYSTEM AND CONTROL METHOD FOR THE SAME

CROSS-REFERENCE TO RELATED APPLICATION

This application claims under 35 U.S.C. § 119(a) priority to and the benefit of Korean Patent Application No. 10-2013-0150690 filed in the Korean Intellectual Property Office on Dec. 5, 2013, the entire contents of which are incorporated herein by reference.

BACKGROUND (a) Field of the Invention

The present invention relates to a keyless entry system and a control method for the same. More particularly, the present invention relates to a keyless entry system capable of remotely opening and closing a door and a window of a vehicle, and a control method for the same.

(b) Description of the Related Art

According to the development of wireless communication technology, devices that utilize wireless communication have been variously developed and mounted to a vehicle. An example of a device related to wireless communication is a keyless entry system for remotely controlling a door and a trunk of a vehicle through wireless communication.

The keyless entry system conventionally includes a remote control key possessed by a user such as a driver, and the remote control key is variously called a smart key, a fob key, or a remote starting key. Accordingly, the remote control key can be referred to as a smart key, a fob key, or a remote starting key using the wireless communication technology, and such terms may be used interchangeably.

A keyless entry system capable of remotely controlling a power window system is disclosed in Korean Patent No. 0181490. The keyless entry system disclosed in Korean Patent No. 0181490 compares an input time of a door lock signal or a door unlock signal with a predetermined time. A door is operated when the input time is shorter than the predetermined time, and a window is operated when the input time is longer than the predetermined time.

However, since the keyless entry system disclosed in Korean Patent No. 0181490 continuously transmits and receives signals for detecting the input time, there is a problem in that battery consumption of the remote control key is increased.

The above information disclosed in this Background section is only for enhancement of understanding of the background of the invention and therefore it may contain information that does not form the prior art that is already known in this country to a person of ordinary skill in the art.

SUMMARY

The present invention discloses a keyless entry system and a control method for the same having advantages of remotely controlling a door, a window, and a sunroof by dividing a function code field.

A keyless entry system for remotely controlling a door and a window of a vehicle according to an exemplary embodiment of the present invention may include: a remote control key storing a plurality of function codes, selecting a function code corresponding to an on-duration time of a lock switch or an on-duration time of an unlock switch, modulating the selected function code into a wireless signal, and transmitting the wireless signal; and a receiving device receiving the wireless signal, demodulating the wireless signal into the function code, and outputting a door control signal or a window control signal according to the modulated function code, wherein the function code is divided into a basic function code field and a window function code field.

The remote control key may perform the modulation and the transmission only when the function code is selected.

The plurality of function codes may include a first function code for unlocking the door and a second function code for opening the window.

The remote control key may select the first function code if the on-duration time of the unlock switch becomes a first predetermined time, and select the second function code if the on-duration time of the unlock switch becomes a second predetermined time, wherein the second predetermined time is longer than the first predetermined time.

The plurality of function codes may further include a third function code for stopping opening operation of the window, wherein the remote control key selects the third function code if the on-duration time of the unlock switch becomes a third predetermined time, and wherein the third predetermined time is longer than the second predetermined time.

The remote control key may select the third function code if the on-duration time of the unlock switch is longer than the second predetermined time and the unlock switch is turned off.

The plurality of function codes may further include a fourth function code for locking the door and closing the window, wherein the remote control key selects the fourth function code if the on-duration time of the lock switch becomes the first predetermined time.

The remote control key may enter a sleep mode where the on-duration time is not measured if the on-duration time of the lock switch or the unlock switch becomes a fourth predetermined time.

The receiving device may output a sunroof control signal for opening a sunroof if the demodulated function code is the second function code, and output a sunroof control signal for closing the sunroof if the demodulated function code is the fourth function code.

In the case that the remote control key further include an operating switch in addition to the lock switch and the unlock switch, only the function code field may be used if the operating switch is turned on.

The remote control key may include: the lock switch that is turned on according to an operation of a lock button; the unlock switch that is turned on according to an operation of an unlock button; a timer measuring an elapsed time after a particular time; a first memory storing the plurality of function codes; a key controller electrically connected to the lock switch, the unlock switch, the timer, and the first memory, and selecting the function code corresponding to the on-duration time of the lock switch or the on-duration time of the unlocks switch; and a wireless signal transmitter modulating the function code applied from the key controller and transmitting the wireless signal.

The remote control key may modulate an ID code into a wireless signal and transmit the modulated signal, wherein the receiving device includes: a second memory storing the plurality of function codes and the ID code; a wireless signal receiver demodulating the wireless signal to the function code and the ID code; and a control module outputting a door control signal for controlling the door or a window control signal for controlling the window according to the demodulated function code, wherein the control module compares the demodulated ID code with the ID code stored in the second memory and authenticates the remote control key.

A control method of a keyless entry system for remotely controlling a door and a window of a vehicle according to an exemplary embodiment of the present invention may include: checking a turned-on switch among an unlock switch and a lock switch provided in a remote control key; measuring on-duration time of the turned-on switch; selecting a function code corresponding to the on-duration time of the turned-on switch among a plurality of function codes; modulating the selected function code into a wireless signal and transmitting the wireless signal; receiving the wireless signal and demodulating the wireless signal into the function code; and outputting a door control signal for controlling the door or a window control signal for controlling the window according to the demodulated function code, wherein the function code is divided into a basic function code field and a window function code field.

The plurality of function codes may include a first function code for unlocking the door and a second function code for opening the window.

If the turned-on switch is an unlock switch, the selecting of a function code may include: selecting the first function code if the on-duration time of the unlock switch becomes a first predetermined time; and selecting the second function code if the on-duration time of the unlock switch becomes a second predetermined time, wherein the second predetermined time is longer than the first predetermined time.

The plurality of function codes may further include a third function code for stopping the opening operation of the window, wherein the selecting of a function code may further include selecting the third function code if the on-duration time of the unlock switch becomes a third predetermined time, wherein the third predetermined time is longer than the second predetermined time.

The selecting of function code may further include selecting the third function code if the on-duration time of the unlock switch is longer than the second predetermined time and the unlock switch is turned off.

The plurality of function codes may further include a fourth function code for locking the door and closing the window, wherein if the turned-on switch is a lock switch, the selecting of a function code further include selecting the fourth function code if the on-duration time of the lock switch becomes the first predetermined time.

The control method may further include entering a sleep mode where the on-duration time is not measured if the on-duration time of the turned-on switch becomes the fourth predetermined time.

The outputting may include outputting a sunroof control signal for opening a sunroof if the demodulated function code is the second function code, and outputting a sunroof control signal for closing the sunroof if the demodulated function code is the fourth function code.

According to an exemplary embodiment of the present invention, a user such as a driver can close and open not only the door but also the window by using one lock button and one unlock button.

In addition, the window and the sunroof may be opened or closed simultaneously.

Further, the function code field is divided into the basic function code field and the window function code field, and thus malfunction of the window may be prevented.

BRIEF DESCRIPTION OF THE DRAWINGS

FIG. 4A and FIG. 4B are flowcharts of a control method of a keyless entry system according to an exemplary embodiment of the present invention.

FIG. 5 is a timing graph describing an operation manner of a keyless entry system according to an exemplary embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
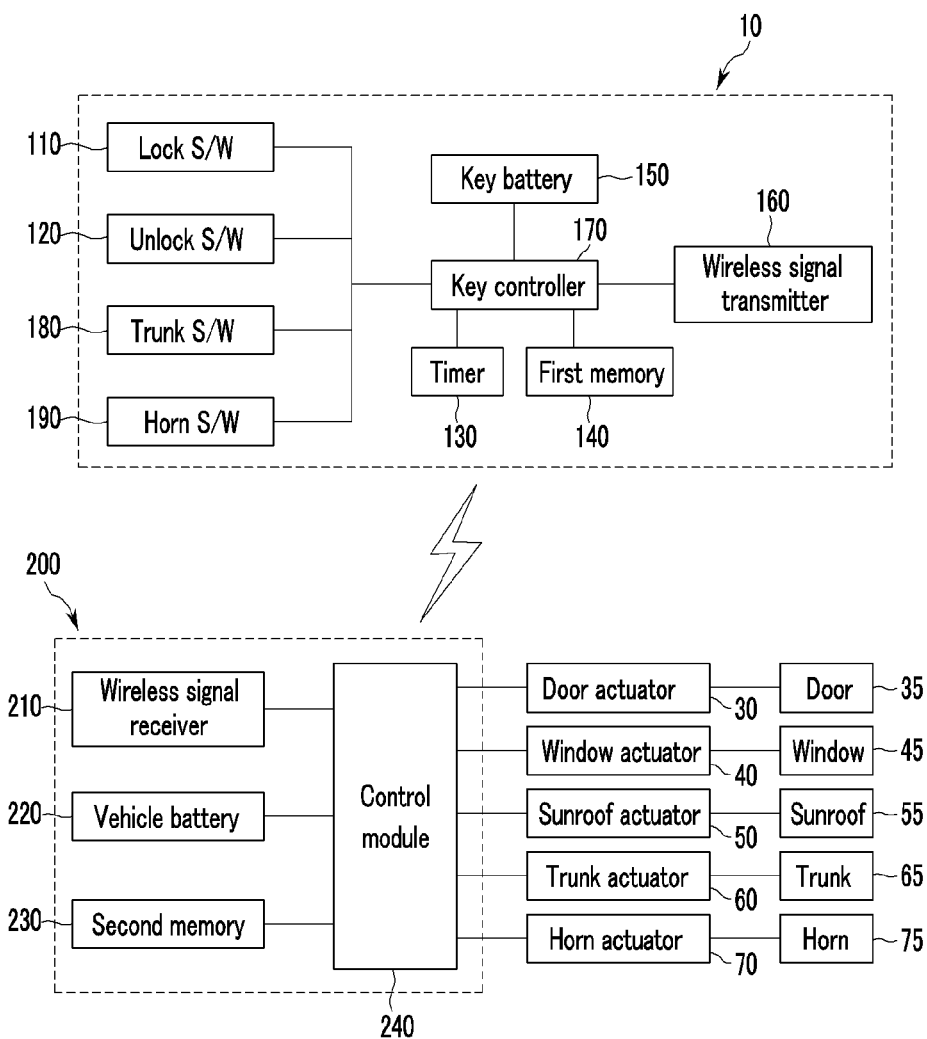
FIG. 1 is a block diagram of a keyless entry system according to an exemplary embodiment of the present invention.
Figure 2:
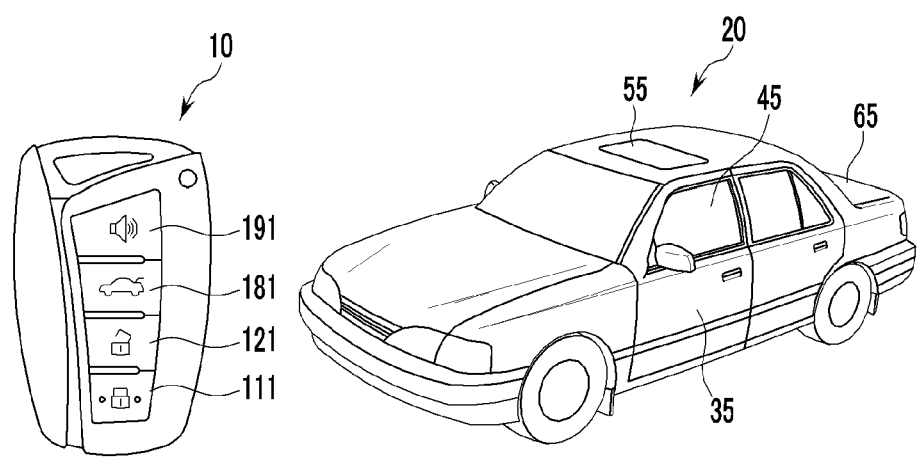
FIG. 2 is a drawing illustrating an outer appearance of a remote control key according to an exemplary embodiment of the present invention.

FIG. 1 is a block diagram of a keyless entry system according to an exemplary embodiment of the present invention. FIG. 2 is a drawing illustrating an outer appearance of a remote control key according to an exemplary embodiment of the present invention.

As shown in FIG. 1 and FIG. 2, a keyless entry system according to an exemplary embodiment of the present invention includes a remote control key 10 that is operated by a user such as a driver, and a receiving device 200 that is installed in a vehicle 20 and receives a wireless signal from the remote control key 10.

The remote control key 10 includes a lock switch 110, an unlock switch 120, a timer 130, a first memory 140, a key battery 150, a wireless signal transmitter 160, and a key controller 170.

The remote control key 10 may further include a trunk switch 180 corresponding to a trunk button 181 for remotely opening a trunk 65 of the vehicle 20, and a horn switch 190 corresponding to a horn button 191 for remotely operating a horn 75 of the vehicle 20.

The lock switch 110 corresponds to a lock button 111 for remotely locking a door 35 of the vehicle 20, and the unlock switch 120 corresponds to an unlock button 121 for remotely unlocking the door 35 of the vehicle 20.

The lock switch 110 is turned on according to an operation of the lock button 111, and the unlock switch 120 is turned on according to an operation of the unlock button 121.

The timer 130 measures an elapsed time after a particular time. The particular time may be a time at which the lock switch 110 is turned on or the unlock switch 120 is turned on.

Figure 3:
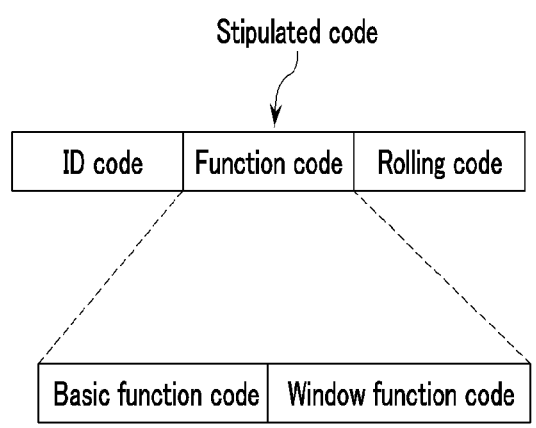
FIG. 3 is a schematic diagram illustrating a data structure of a stipulated code according to an exemplary embodiment of the present invention.

The first memory 140 stores a plurality of predetermined function codes. Referring to FIG. 3, one stipulated code includes an identification code (ID code), one of the plurality of predetermined function codes, and a rolling code. The stipulated code may further include a maker code that is set according to each nation, and an error code for a cyclic redundancy check (CRC).

The receiving device 200 authenticates the remote control key 10 based on the ID code. The function code corresponds to a function selected by the user according to an operation of the remote control key 10. The rolling code is a code that is changed whenever the remote key 10 is operated by the user.

The ID code, the rolling code, the maker code, and the error code are known to a person of ordinary skill in the art, and thus detailed description will be omitted. For example, the value of the rolling code may be sequentially increased whenever the remote key 10 is operated. The receiving device 200 may compare a currently received rolling code with a stored rolling code in a second memory 230, and determine that the stipulated code is normal if the currently received rolling code is greater than the stored rolling code.

The function code according to an exemplary embodiment of the present invention is divided into a basic function code field and a window function code field. The size of the function code may be 32 bits and the size of the window function code may be 4 bits, but they are not limited thereto. One of a code corresponding to a lock/unlock function of the door 35, a code corresponding to an open function of the trunk 65, and a code corresponding to an operation function of the horn 75 may be stored in the basic function code field. A code corresponding to the open/close function of a window 45 may be stored in the window function code field.

In the case of the function code corresponding to the lock switch 110 or the unlock switch 120, the window function code field is used. However, in the case of the function code corresponding to the trunk switch 180 or the horn switch 190, the window function code field is not used but only the basic function code field is used. Accordingly, the window 45 is prevented from being mis-operated (i.e., operated inadvertently or incorrectly). Although the user operates the trunk button 181 or the horn button 191, the window 45 is not opened or closed.

The key battery 150 supplies power for operating the remote control key 10.

The wireless signal transmitter 160 modulates the stipulated code into a wireless signal and transmits the wireless signal. The wireless signal may be a radio frequency (RF) signal, but is not limited thereto.

The key controller 170 may be implemented with one or more microprocessors executed by a predetermined program. The predetermined program may include a series of commands for performing each step included in a control method of the keyless entry system according to an exemplary embodiment of the present invention to be described below. The predetermined program may be embodied in a non-transitory computer readable medium.

The plurality of function codes may include a first function code for unlocking the door 35, a second function code for opening the window 45, a third function code for stopping the opening operation of the window 45, and a fourth function code for locking the door 35 and closing the window 45.

In addition, the plurality of function codes may further include a function code for opening the trunk 65 and a function code for operating the horn 75.

The receiving device 200 according to an exemplary embodiment of the present invention includes a wireless signal receiver 210, a vehicle battery 220, the second memory 230, and a control module 240.

The wireless signal receiver 210 receives the wireless signal transmitted from the wireless signal transmitter 160 and demodulates the wireless signal into the stipulated code.

The vehicle battery 220 supplies power for operating the receiving device 200.

The second memory 230 stores the plurality of function codes. Further, the second memory 230 stores the ID code and the rolling code.

The control module 240 may be a body control module (BCM) that controls body electric parts of the vehicle 20. The control module 240 may be implemented with one or more microprocessors executed by a predetermined program. The predetermined program may include a series of commands for performing each step included in a control method of the keyless entry system according to an exemplary embodiment of the present invention to be described below. The predetermined program may be embodied in a non-transitory computer readable medium.

The control module 240 compares the demodulated function code with a plurality of function codes stored in the second memory 230, and outputs a control signal according to the comparison result.

A door actuator 30 locks or unlocks the door 35 according to a door control signal of the control module 240. A window actuator 40 opens or closes the window 45 according to a window control signal of the control module 240. A sunroof actuator 50 opens or closes a sunroof 55 according to a sunroof control signal of the control module 240. A trunk actuator 60 opens the trunk 65 according to a trunk control signal of the control module 240. A horn actuator 70 operates the horn 75 according to a horn control signal of the control module 240.

Hereinafter, a control method of the keyless entry system will be described in detail with reference to FIG. 4A, FIG. 4B, and FIG. 5.

Figure 4B:
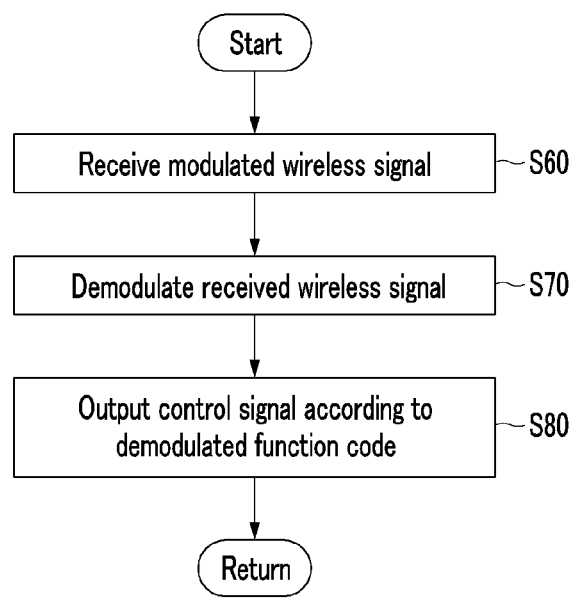

FIG. 4A and FIG. 4B are flowcharts of a control method of a keyless entry system according to an exemplary embodiment of the present invention. FIG. 5 is a timing graph describing an operation manner of a keyless entry system according to an exemplary embodiment of the present invention.

Referring to FIG. 4A and FIG. 4B, a control method of a keyless entry system according to an exemplary embodiment of the present invention begins when any one of the plurality of switches is turned on at step S10.

The key controller 170 checks the turned-on switch at step S20.

If the turned-on switch is the unlock switch 120, the key controller 170 measures on duration time ($t_{unlock}$) of the unlock switch 120 using the timer 130 at step S30.

The key controller 170 compares the on-duration time ($t_{unlock}$) of the unlock switch 120 with a first predetermined time ($t_1$) at step S31. The first predetermined time ($t_1$) can be arbitrarily set by a person of ordinary skill in the art, and for example, may be 0 seconds.

If the on-duration time ($t_{unlock}$) of the unlock switch 120 becomes the first predetermined time ($t_1$), the key controller 170 selects the first function code at step S32. In particular, if the unlock switch 120 is turned on, the key controller 170 selects the first function code for unlocking the door 35. In this case, as shown in FIG. 5, the key controller 170 modulates the first function code into the wireless signal and transmits the wireless signal to the receiving device 200 through the wireless signal transmitter 160. The key controller 170 may perform modulation and transmission of the wireless signal corresponding to the first function code only when the first function code is selected.

Thereafter, if the turned-on state of the unlock switch 120 is continued, the key controller 170 compares the on-duration time ($t_{unlock}$) of the unlock switch 120 with a second predetermined time ($t_2$) at step S33. The second predetermined time ($t_2$) can be arbitrarily set by a person of ordinary skill in the art, and for example, may be 2 seconds.

If the on-duration time ($t_{unlock}$) of the unlock switch 120 becomes the second predetermined time ($t_2$), the key controller 170 selects the second function code at step S34. In particular, if the turned-on state of the unlock switch 120 is continued for 2 seconds, the key controller 170 selects the second function code for opening the window 45. In this case, as shown in FIG. 5, the key controller 170 modulates the second function code into the wireless signal and transmits the wireless signal to the receiving device 200 through the wireless signal transmitter 160. The key controller 170 may perform modulation and transmission of the wireless signal corresponding to the second function code only when the second function code is selected.

Thereafter, if the turned-on state of the unlock switch 120 is continued, the key controller 170 compares the on-duration time ($t_{unlock}$) of the unlock switch 120 with a third predetermined time ($t_3$) at step S35. The third predetermined time ($t_3$) can be arbitrarily set by a person of ordinary skill in the art, and for example, may be 4.5 seconds.

If the on-duration time ($t_{unlock}$) of the unlock switch 120 becomes the third predetermined time ($t_3$), the key controller 170 selects the third function code at step S36. In particular, if the turned-on state of the unlock switch 120 is continued for 4.5 seconds, the key controller 170 selects the third function code for stopping the opening operation of the window 45. In this case, as shown in FIG. 5, the key controller 170 modulates the third function code into the wireless signal and transmits the wireless signal to the receiving device 200 through the wireless signal transmitter 160. The key controller 170 may perform modulation and transmission of the wireless signal corresponding to the third function code only when the third function code is selected.

If the on-duration time ($t_{unlock}$) of the unlock switch 120 is longer than the second predetermined time ($t_2$) and the unlock switch 120 is turned off at step S35, the key controller 170 selects the third function code at step S37. After the second function code is selected, the key controller 170 may select the third function code if the unlock switch 120 is turned off even though the turned-on state of the unlock switch 120 is not continued for 4.5 seconds. Accordingly, the user such as the driver can control an opening degree of the window 45.

Thereafter, if the turned-on state of the unlock switch 120 is continued, the key controller 170 compares the on-duration time ($t_{unlock}$) of the unlock switch 120 with a fourth predetermined time ($t_4$) at step S38. The fourth predetermined time ($t_4$) may be arbitrarily set by a person of ordinary skill in the art, and for example, may be 30 seconds.

If the on duration time ($t_{unlock}$) of the unlock switch 120 becomes the fourth predetermined time ($t_4$), the key controller 170 enters a sleep mode where the on duration time ($t_{unlock}$) is not measured at step S39. Accordingly, unnecessary power consumption of the key battery 150 can be prevented.

If the turned-on switch is the lock switch 110 at step S20, the key controller 170 measures on-duration time ($t_{unlock}$) of the lock switch 110 using the timer 130 at step S40.

The key controller 170 compares the on-duration time ($t_{unlock}$) of the lock switch 110 with the first predetermined time ($t_1$) at step S41.

If the on-duration time ($t_{Lock}$) of the lock switch 110 becomes the first predetermined time ($t_1$), the key controller 170 selects a fourth function code at step S42. In particular, if the lock switch 110 is turned on, the key controller 170 selects the fourth function code for locking the door 35. In this case, the key controller 170 modulates the fourth function code into the wireless signal and transmits the wireless signal to the receiving device 200 through the wireless signal transmitter 160. The key controller 170 may perform modulation and transmission of the wireless signal corresponding to the fourth function code only when the fourth function code is selected.

Thereafter, if the turned-on state of the lock switch 110 is continued, the key controller 170 compares the on-duration time ($t_{Lock}$) of the lock switch 110 with the fourth predetermined time ($t_4$) at step S43.

If the on-duration time ($t_{Lock}$) of the lock switch 110 becomes the fourth predetermined time ($t_4$), the key controller 170 enters the sleep mode where the on-duration time ($t_{Lock}$) is not measured at step S44.

If the turned-on switch is the trunk switch 180 at step S20, the key controller 170 measures on-duration time ($t_{Trunk}$) of the trunk switch 180 using the time 130 at step S50.

The key controller 170 compares the on-duration time ($t_{Trunk}$) of the trunk switch 180 with the first predetermined time ($t_1$) at step S51.

If the on duration time ($t_{Trunk}$) of the trunk switch 180 becomes the first predetermined time ($t_1$), the key controller 170 selects the function code for opening the trunk 65 at step S52. In particular, if the trunk switch 180 is turned on, the key controller 170 selects the function code for opening the trunk 65. In this case, the key controller 170 modulates the function code for opening the trunk 65 into the wireless signal and transmits the wireless signal to the receiving device 200 through the wireless signal transmitter 160.

Thereafter, if the turned-on state of the trunk switch 180 is continued, the key controller 170 compares the on-duration time ($t_{Trunk}$) of the trunk switch 180 with the fourth predetermined time ($t_4$) at step S53.

If the on-duration time ($t_{Trunk}$) of the trunk switch 180 becomes the fourth predetermined time ($t_4$), the key controller 170 enters the sleep mode where the on-duration time ($t_{Trunk}$) is not measured at step S54.

If the turned-on switch is the horn switch 190 at step S20, the remote control key 10 is operated in a like manner of the case in which the trunk switch 180 is turned on.

The control module 240 receives the modulated wireless signal through the wireless signal receiver 210 at step S60, and demodulates the modulated wireless signal into the stipulated code at step S70. The control module 240 compares the demodulated ID code with the ID code stored in the second memory 230 such that the remote control key 10 is authenticated.

The control module 240 outputs a control signal according to the demodulated function code at step S80. In particular, the control module 240 compares the demodulated function code with the plurality of function codes stored in the second memory 230, and outputs the control signal according to the comparison result.

If the demodulated function code is the first function code, the control module 240 outputs the door control signal for unlocking the door 35 to the door actuator 30.

If the demodulated function code is the second function code, the control module 240 outputs the window control signal for opening the window 45 to the window actuator 40. In this case, if the demodulated function code is the second function code, the control module 240 outputs the sunroof control signal for opening the sunroof 55 to the sunroof actuator 50. Accordingly, the window 45 and the sunroof 55 may be opened simultaneously.

If the demodulated function code is the third function code, the control module 240 outputs the window control signal for stopping the opening of the window 45 to the window actuator 40.

If the demodulated function code is the fourth function code, the control module 240 outputs the door control signal for locking the door 35 to the door actuator 30. In this case, if the demodulated function code is the fourth function code, the control module 240 outputs the window control signal for closing the window 45 to the window actuator 40. In addition, if the demodulated function code is the fourth function code, the control module 240 may output the sunroof control signal for closing the sunroof 55 to the sunroof actuator 50. Accordingly, the window 45 and the sunroof 55 may be closed when the door 35 is locked.

If the demodulated function code is the function code for opening the trunk 65, the control module 240 outputs the trunk control signal for opening the trunk 65 to the trunk actuator 60. If the demodulated function code is the function code for operating the horn 75, the control module 240 outputs the horn control signal for operating the horn 75 to the horn actuator 70.

The function code according to an exemplary embodiment of the present invention is divided into the basic function code field and the window function code field.

One of the code corresponding to the lock/unlock function of the door 35, the code corresponding to the open/close function of the window 45, the code corresponding to the open function of the trunk 65, and the code corresponding to the operation function of the horn 75 is set in the function code field.

Both the basic function code field and the window function code field are used if the lock switch 110 or the unlock switch 120 is turned on, but only the basic function code field is used if the trunk switch 180 or the horn switch 190 is turned on.

According to an exemplary embodiment of the present invention, the user can close and open not only the door 35 but also the window 45 by using one lock button 111 and one unlock button 121.

In addition, the window 45 and the sunroof 55 may be opened or closed simultaneously.

Further, the function code field is divided into the basic function code field and the window function code field, and thus malfunction of the window 45 may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A keyless entry system for remotely controlling a door and a window of a vehicle, comprising:
    a remote control key storing a plurality of function codes, selecting a function code corresponding to an on-duration time of a lock switch or an on-duration time of an unlock switch, modulating the selected function code into a wireless signal, and transmitting the wireless signal; and
    a receiving device receiving the wireless signal, demodulating the wireless signal into the function code, and outputting a door control signal or a window control signal according to the modulated function code, wherein
    the function code is divided into a basic function code field and a window function code field,
    the plurality of function codes include a first function code for unlocking the door and a second function code for opening the window, and
    the remote control key selects the first function code when the on-duration time of the unlock switch becomes a first predetermined time, and selects the second function code when the on-duration time of the unlock switch becomes a second predetermined time, wherein the second predetermined time is longer than the first predetermined time.

2. The keyless entry system of claim 1, wherein the remote control key performs the modulation and the transmission only when the function code is selected.

3. The keyless entry system of claim 1, wherein the plurality of function codes further comprise a third function code for stopping opening operation of the window, wherein the remote control key selects the third function code if the on-duration time of the unlock switch becomes a third predetermined time, and wherein the third predetermined time is longer than the second predetermined time.

4. The keyless entry system of claim 3, wherein the remote control key selects the third function code if the on-duration time of the unlock switch is longer than the second predetermined time and the unlock switch is turned off.

5. The keyless entry system of claim 3, wherein the plurality of function codes further comprise a fourth function code for locking the door and closing the window, wherein the remote control key selects the fourth function code if the on-duration time of the lock switch becomes the first predetermined time.

6. The keyless entry system of claim 5, wherein the remote control key enters a sleep mode where the on-duration time is not measured if the on-duration time of the lock switch or the unlock switch becomes a fourth predetermined time.

7. The keyless entry system of claim 5, wherein the receiving device outputs a sunroof control signal for opening a sunroof if the demodulated function code is the second function code, and outputs a sunroof control signal for closing the sunroof if the demodulated function code is the fourth function code.

8. The keyless entry system of claim 1, wherein in the case that the remote control key further comprises an operating switch in addition to the lock switch and the unlock switch, only the basic function code field is used if the operating switch is turned on.

9. The keyless entry system of claim 1, wherein the remote control key comprises:
    the lock switch that is turned on according to an operation of a lock button;
    the unlock switch that is turned on according to an operation of an unlock button;
    a timer measuring an elapsed time after a particular time;
    a first memory storing the plurality of function codes;
    a key controller electrically connected to the lock switch, the unlock switch, the timer, and the first memory, and selecting the function code corresponding to the on-duration time of the lock switch or the on-duration time of the unlock switch; and
    a wireless signal transmitter modulating the function code applied from the key controller and transmitting the wireless signal.

10. The keyless entry system of claim 1, wherein the remote control key modulates an ID code into a wireless signal and transmits the modulated signal,
    wherein the receiving device comprises:
    a second memory storing the plurality of function codes and the ID code;
    a wireless signal receiver demodulating the wireless signal to the function code and the ID code; and
    a control module outputting a door control signal for controlling the door or a window control signal for controlling the window according to the demodulated function code,
    wherein the control module compares the demodulated ID code with the ID code stored in the second memory and authenticates the remote control key.

11. A control method of a keyless entry system for remotely controlling a door and a window of a vehicle, the control method comprising:
    checking a turned-on switch among an unlock switch and a lock switch provided in a remote control key;
    measuring on-duration time of the turned-on switch;
    selecting a function code corresponding to the on-duration time of the turned-on switch among a plurality of function codes;
    modulating the selected function code into a wireless signal and transmitting the wireless signal;
    receiving the wireless signal and demodulating the wireless signal into the function code; and
    outputting a door control signal for controlling the door or a window control signal for controlling the window according to the demodulated function code, wherein
    the function code is divided into a basic function code field and a window function code field,
    the plurality of function codes comprises a first function code for unlocking the door and a second function code for opening the window, and
    when the turned-on switch is the unlock switch, the selecting of a function code comprises:
        selecting the first function code if the on-duration time of the unlock switch becomes a first predetermined time; and
        selecting the second function code if the on-duration time of the unlock switch becomes a second predetermined time, wherein the second predetermined time is longer than the first predetermined time.

12. The control method claim 11, wherein the plurality of function codes further comprise a third function code for stopping the opening operation of the window,
    wherein the selecting of a function code further comprises:
    selecting the third function code if the on-duration time of the unlock switch becomes a third predetermined time, wherein the third predetermined time is longer than the second predetermined time.

13. The control method of claim 12, wherein the selecting of a function code further comprises selecting the third function code if the on-duration time of the unlock switch is longer than the second predetermined time and the unlock switch is turned off.

14. The control method of claim 12, wherein the plurality of function codes further comprises a fourth function code for locking the door and closing the window,
    wherein if the turned-on switch is a lock switch,
    the selecting of a function code further comprises:
    selecting the fourth function code if the on-duration time of the lock switch becomes the first predetermined time.

15. The control method of claim 14, further comprising entering a sleep mode where the on-duration time is not measured if the on-duration time of the turned-on switch becomes the fourth predetermined time.

16. The control method of claim 14, wherein the outputting further comprises:
    outputting a sunroof control signal for opening a sunroof if the demodulated function code is the second function code; and
    outputting a sunroof control signal for closing the sunroof if the demodulated function code is the fourth function code.

* * * * *